United States Patent

Franco et al.

[15] 3,638,000
[45] Jan. 25, 1972

[54] METHOD AND APPARATUS FOR CONTINUOUSLY DETERMINING THE QUANTITIES OF THE QUALITATIVELY KNOWN RADIOACTIVE NUCLIDES CONTAINED IN A PHYSICAL SYSTEM

[72] Inventors: Gianfranco Franco; Carlo Mancini; Angiolo Pulacci, all of Rome, Italy

[73] Assignee: Comitato Nazionale per l'Energia Nucleare, Rome, Italy

[22] Filed: Oct. 3, 1967

[21] Appl. No.: 672,539

[30] Foreign Application Priority Data

Oct. 7, 1966  Italy..........................................787056

[52] U.S. Cl..........................................235/151.35, 250/83.3
[51] Int. Cl. ..........................................G06g 7/34
[58] Field of Search ................235/151.35, 151.3, 184, 185, 235/180; 250/83.3; 176/22, 23

[56] References Cited

UNITED STATES PATENTS

| | | | |
|---|---|---|---|
| 2,905,821 | 9/1959 | Younkin | 235/180 X |
| 2,924,384 | 2/1960 | Porter | 235/180 |
| 3,178,565 | 4/1965 | Honore et al. | 235/180 |
| 2,942,109 | 6/1960 | Bell et al. | 250/83.3 X |
| 3,171,023 | 2/1965 | Des Seguin Des Hons | 235/184 X |

Primary Examiner—Malcolm A. Morrison
Assistant Examiner—Edward J. Wise
Attorney—Richards & Geier

[57] ABSTRACT

A computer of the analog-type adapted for the solution of a system of $n$ linear equations with $n$ unknown quantities is associated with a multichannel analyzer (particularly an analyzer with $n$ channels) the output of which represents the counting rates related to $n$ energy levels $E_k$ suitably chosen from the resultant spectrum of the $n$ nuclides $N_k$.

3 Claims, 1 Drawing Figure

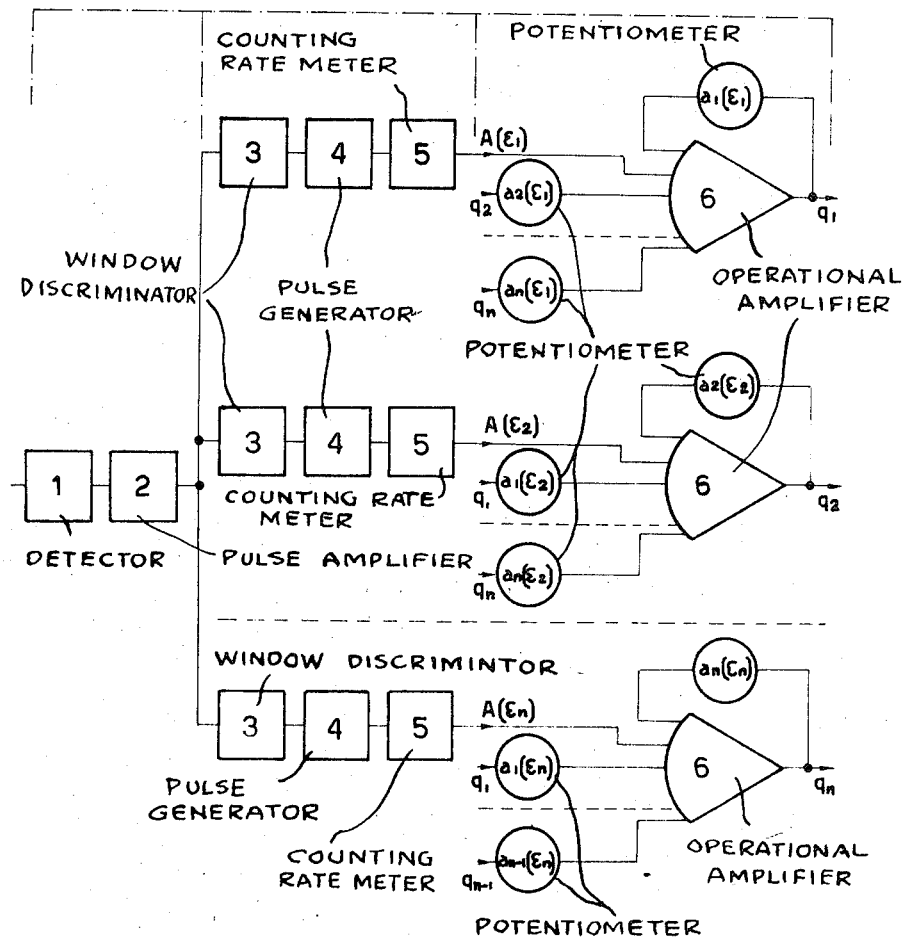

METHOD AND APPARATUS FOR CONTINUOUSLY DETERMINING THE QUANTITIES OF THE QUALITATIVELY KNOWN RADIOACTIVE NUCLIDES CONTAINED IN A PHYSICAL SYSTEM

The present invention relates to a method for determining the quantities $q_k$ of $n$ radioactive ... $N_k$ ($k=1, 2\ 0\ldots n$) present in a given physical system. The method is based upon the concept of reducing the measurement of said quantities to the solution of a system of linear algebraic equations with constant coefficients; an apparatus also is disclosed for applying this method.

By applying this method with the aid of the apparatus which is the object of this invention, the drawbacks are overcome which usually hinder this kind of measurements due to the radioactivity of the samples to be measured inasmuch as there is no occasion of the operator of this apparatus for coming into contact with the system containing the nuclides under examination. By this apparatus the measurements can also be carried out in a continuous way and furthermore, when the system to be analyzed is included in a plant, this method can be used for setting up an automatic online control of the quantities $q_k$.

It is therefore an object of the present invention to provide a method and an apparatus for determining in a continuous way the quantities $q_k$ of $n$ nuclides $N_k$ contained in a system; which method and apparatus contemplate the use of means for detecting the radiation emitted by the $n$ nuclides and means for effecting, with the data produced by said detecting means, a calculation whereby each of the $n$ nuclides can be quantitatively distinguished from the others, the task of the operator being bound to the presetting of the computing means.

Another object of this invention is to provide an apparatus as above in a portable and compact form and such that does not require highly specialized operators.

Other objects and advantages of the present invention will become apparent from the following description, wherein special reference is made to the gamma radioactivity. However other types of radioactivity (alpha, beta) can also be taken into consideration inasmuch as they exert an influence on the measuring means only of the radiation; which means supplies the data for the calculation, as will be illustrated later on.

As known, to each nuclide $N_k$ a radioactivity spectrum is associated which is a function of the energy E. If the spectrum of the nuclides $N_k$ as referred to its unit quantity is indicated by $a_k(E)$, basing on the widely verified hypothesis that the principle of the superposition of the effects is applicable, the energy spectrum $A(E)$ of the system under examination is given by the following expression:

$$A(E) = q_1 a_1(E) + q_2 a_2(E) + \ldots + q_n a_n(E) \quad (1)$$

After chosing in each spectrum $a_k(E)$ an energy level $E_k$, the equation (1) written for the $n$ values $E_k$ gives rise to the system (2) of $n$ linear equations in the $n$ unknown quantities $q_k$.

$$\begin{aligned}
A(E_1) &= q_1 a_1(E_1) + q_2 a_2(E_1) + \ldots + q_n a_n(E_1) \\
A(E_2) &= q_1 a_1(E_2) + q_2 a_2(E_2) + \ldots + q_n a_n(E_2) \\
A(E_n) &= q_1 a_1(E_n) + q_2 a_2(E_n) + \ldots + q_n a_n(E_n)
\end{aligned} \quad (2)$$

wherein the $n$ known terms $A(E_k)$ of the system (2) represent the variable data of the calculation and are provided in the present case by an apparatus of conventional type, which measures the radioactivity as a function of the energy.

The $n$ coefficients $a_h(E_k)$ (with $h$ and $k=1,2\ldots n$) represent constant data of the calculation and are determined once for all at the beginning of the measurements, by deducing them from the tables of the spectrums or by experiment. However, in the last case, the same apparatus used for measuring the quantities $A(E_k)$ will be advantageously used in order to prevent the unknown quantities $q_k$ from being affected by calibration errors inherent of the particular measuring system adopted.

The energy level $E_k$ associated with the nuclide $N_k$ will be chosen in a way that it gives the best characterization of the corresponding spectrum $a_k(E)$ and generally it will coincide with the energy level at which the peak of maximum activity occurs.

For the solution of equation (2) an analog or digital computer will be required adapted for solving a system of $n$ linear equations with $n$ unknown quantities.

In some particular cases wherein the peaks of maximum activity of the $n$ nuclides are very distant from one another, the peak $A(E_k)$ of the resultant spectrum is substantially due to the nuclides $N_k$ only. In these cases the coefficients $a_h(E_k)$ of the system of equations (2) with $h \ne k$ are very small and in a first approximation they can be made equal to zero. The simplified system of equations (3) is attained, for the solution of which no computer is apparently required.

$$\begin{aligned}
A(E_1) &= c_1 a_1(E_1) \\
A(E_2) &= C_2 a_2(E_2) \\
&\ldots \\
A(E_n) &= c_n a_n(E_n)
\end{aligned} \quad (3)$$

For applying the above method the means currently used to this purpose and the conventional techniques could obviously be used; however, in the case of this particular problem, such means and techniques imply the availability of large apparatus, that is of big analog computers and the availability of highly specialized personnel for operating them and as a consequence of relevant financial means and ample premises.

On the other hand, the apparatus of this invention offers the advantage of obtaining the same results at an extremely lower cost; it is very compact and does not require any specialized operators.

The structure of this apparatus is diagrammatically illustrated in the FIGURE.

In this FIGURE a detector 1, which in the case of gamma rays may be a NaI crystal and a phototube is connected to an amplifier 2. This may be a usual pulse amplifier of which the response time, band-pass and noise diagram characteristics are related to said detector. At the output of the amplifier $n$ counting units are connected in parallel which comprise the elements 3, 4, 5. Each unit comprises the following:

a. a window discriminator 3 with two thresholds: a first one variable within a range of values of which the upper limit is the value corresponding to the pulse of maximum energy and the lower limit is the pulse corresponding to the lowest energy; and a second threshold associated with the first one and variable with respect to it within an interval ranging from 0 to a certain fraction of the end of scale value of the measuring instrument. Therefore those pulses only of which the height is comprised between these two thresholds are allowed to pass through the discriminator.

b. A pulse originator 4 for rendering uniform in shape and size the output pulses from the discriminator; this may be a monostable multivibrator.

c. A counting rate meter 5 which transforms the mean frequency of the pulses from the pulse originator in a voltage proportional to said frequency. The $n$ counting units assembled together make up a particular multichannel analyzer which provides a continuous measurement of the activities of $n$ energy levels of the spectrum; that is it provides the values $A(E_k)$ which are the known terms of the system (2).

Each of these terms represents one of the input quantities for each of the $n$ operational amplifiers 6 which all together make up the computer proper. The whole computer therefore comprises the assembly of the $n$ amplifiers plus the $n$ potentiometers $a_h(E_k)$; each amplifier being provided with $n$ potentiometers.

At the $n+1$ inlets of each amplifier the following signals are applied:

the signal from the corresponding counting chain;

the output signals from the remaining $n-1$ amplifiers, attenuated by means of the potentiometers $a_k(E_h)$ (with $h \ne k$) according to factors corresponding to the coefficients of the equations of the system;

the output signals of the amplifier itself through the potentiometer $a_k(E_k)$.

The operator, for starting the apparatus, first of all must introduce the coefficients $a_h(E_k)$ into the potentiometers of the computer. The ratios $a_h(E_k)$ are deduced from the spectra of the nuclides.

As an example, from the spectrum of the $h^k$ nuclide, the activity $A_h(E_h)$ is measured corresponding to the energy level $h$ which has been chosen as significative of this nuclide; in general that energy level is chosen as significative which corresponds to the peak of maximum activity in the spectrum. From the same spectrum the activities $A_h(E_k)$ are then measured corresponding to the energy levels $k$ which have been chosen as significative of the remaining ($n-1$) nuclides. The ratios between the different activities $A_h(E_k)$ corresponding to said energy levels and the activity $A_h(E_h)$ are the coefficients $a_h(E_k$ to be introduced into the potentiometers of the computer. By accomplishing the same operation with the spectra of the remaining $n-1$ nuclides, the $n^2$ ratios are obtained for setting up the calculation by the analog computer. These ratios are generally less than 1 excepting those with indexes $k=h$ which obviously will be equal to 1.

The circular sliders of the potentiometers will be therefore adjusted at such an angle (in the case of circular sliders) that, with the assumption that the angle at end of scale is one, will numerically equalize the deduced ratios. After this operation the measurement can be carried out. The gamma rays emitted by the system under examination are transformed by the detector 1 into electric pulses which through the amplifier 2 reach the counting chains 3, 4, 5; hence the only portions of the same pulses pertaining to the energies $E_k$ are fed into the amplifiers 6 of the computer. At the inlet of each amplifier of the computer, in addition to the signal coming from the corresponding monochannel, the output signals from the remaining $n-1$ amplifiers are also applied along with the signal produced by the amplifier itself; at the outlet of each of said operational amplifiers a voltage will be present proportional to the activity of the nuclide $N_k$ at the chosen energy $E_k$. Said voltage can be read directly at the outlet of each computing unit.

The response time of the whole system is essentially conditioned by the time constants of the counting rate meters 5 which constants at their turn are determined on the basis of the activities of the nuclides $N_k$ in such manner as to obtain a variance of the signal smaller than a predetermined percentage of the same signal.

The weights of each nuclide will be deduced from the results of the calculation on the basis of calibration tables previously prepared according to the following procedure:

The spectrum of a known amount of each nuclide contained in the physical system is separately obtained. It is advisable to obtain such spectra by the same apparatus to be subsequently used for determining the different amounts of the nuclides contained in the physical system to be examined. For obtaining said spectrum, the whole pertinent range of energy is fed to a window discriminator to be discriminated thereby; the output is then recorded as a curve on a coordinate system wherein the energies are the abscissae and the counting rates are the coordinates.

After chosing on these curves the significative peak for each nuclide, the counting rate for a unit quantity of a given nuclide can be determined.

In a preferred embodiment of the apparatus of this invention, usual detectors have been advantageously used and the circuits have been mounted on printed-circuit cards each of which included the window discriminator, the pulse originator, the counting rate meter and an operational amplifier.

The combination of $n$ of said cards represented therefore the whole apparatus.

In addition to their applicability in the field of the automatic control already mentioned, the method and apparatus of this invention can be advantageously used e.g., for continuously determining the behavior of the quantities $q_k$ in those cases when the system undergoes changes in the time or space distribution of the same quantities $q_k$ when the physical system including said quantities is not homogeneous.

It is to be understood however that said apparatus has been described as a nonlimitative example only, inasmuch as both the method and the major parts of the apparatus of this invention can be equally applied to other quantities; in particular the above-mentioned computer could be also of the digital type.

What we claim is:

1. A method for the continuous determination of the individual quantities of $n$ radioactive nuclides present in a physical system and qualitatively known said method comprising the steps of:

transforming the radiation from said physical system into electric pulses by means of a detector;

feeding said pulses to an amplifier;

feeding the output from said amplifier to $n$ counting rate units connected in parallel, each of which units comprises a window discriminator adapted for letting only those pulses to pass therethrough which are produced by said physical system at the energy level chosen from the resulting spectrum of the $n$ nuclides as significative of one of said nuclides, a pulse generator and a counting rate meter connected in series, which units make up a multichannel analyzer with $n$ channels and thereby obtaining from each counting rate unit a voltage which is proportional to the activity of the whole physical system at the level of energy which has been chosen as significative of one of the $n$ nuclides;

deducing from all the spectra separately obtained of each of the $n$ nuclides the ratios of the activities resulting from each of said spectra at the levels of energy significative of the remaining $n-1$ nuclides and the activity at the energy level significative of said each nuclide;

introducing into an analog computer, adapted for solving a system of $n$ linear equations with $n$ unknown quantities $n$ known terms and $n^2$ constant coefficients and comprising $n$ operational amplifiers and $n^2$ potentiometers, the $n$ signals from said multichannel analyzer as known terms of said system, which signals are fed directly to said $n$ operational amplifiers and the $n^2$ values of said system by setting the sliders of said $n^2$ potentiometers, each of said operational amplifiers being also fed with the signals from the remaining $n-1$ operational amplifiers through as many of said $n^2$ potentiometers and with the signal from the same amplifier through another of said $n^2$ potentiometers; and deducing the quantity of each nuclide from the reading at the respective operational amplifier by referring said reading to the corresponding reading for a known quantity of the same nuclide separately examined at the same energy level.

2. An apparatus for the continuous determination of the individual quantities of $n$ radioactive nuclides present in a physical system and qualitatively known, said apparatus comprising a detector for transforming radiation from said physical system into electric pulses, an amplifier connected with said detector, $n$ counting rate units connected in parallel, which make up a multichannel analyzer with $n$ channels, the output of said amplifier being fed to said counting units, each of said units comprising a window discriminator with two thresholds, a pulse generator and a counting rate meter, said counting rate meter transforming the mean frequency of the pulses into a voltage proportional to said frequency, an analog computer, comprising $n$ operational amplifiers and $n^2$ potentiometers, the output of each counting rate unit being fed to one only of the $n$ operational amplifiers included in the analog computer, each of such amplifiers being supplied with $n+1$ inputs, namely the signal from the corresponding counting rate unit, the signals, attenuated by potentiometers, from the remaining $n-1$ amplifiers and the signal from the same amplifier through a potentiometer, the output of each amplifier of the analog computer being a voltage which is proportional to the activity of the corresponding nuclide at the level of energy chosen among the levels of the resulting spectrum of said nuclide.

3. An apparatus in accordance with claim 2, wherein each channel of said analyzer comprises means for the analysis of that portion of the input signal which pertains to a single energy level and is connected to only one of the operational amplifiers making up the analog computer.